United States Patent [19]

Murphy et al.

[11] 4,442,039

[45] Apr. 10, 1984

[54] PROCESS FOR TREATING HYDROXYL TERMINATED LIQUID POLYMERS

[75] Inventors: Walter T. Murphy, Cuyahoga Falls; Clifford D. Guiley, Jr., Medina, both of Ohio

[73] Assignee: The B. F. Goodrich Company, Akron, Ohio

[21] Appl. No.: 375,414

[22] Filed: May 6, 1982

Related U.S. Application Data

[63] Continuation-in-part of Ser. No. 154,671, May 30, 1980, abandoned.

[51] Int. Cl.$^3$ .................. C07C 121/30; C07C 67/48
[52] U.S. Cl. ................... 260/465.4; 560/191; 560/200
[58] Field of Search ............ 260/465.4; 560/191, 560/200

[56] References Cited

U.S. PATENT DOCUMENTS 3,285,949 11/1966 Siebert .................. 260/465.4
3,551,471 12/1970 Siebert .................. 260/465.4
3,551,472 12/1970 Siebert .................. 260/465.4
4,115,415 9/1978 Yoshihara et al. ......... 560/200 X
4,144,395 3/1979 Murphy et al. ............. 560/200

Primary Examiner—Joseph Paul Brust
Attorney, Agent, or Firm—J. Hughes Powell, Jr.

[57] ABSTRACT

Hydroxyl terminated liquid polymers that are excessively active in reaction with organic diisocyanates may be deactivated by treating the hydroxyl terminated liquid polymer with phosphoric acid or sulfuric acid prior to reaction with the organic diisocyanate so that the hydroxyl terminated liquid polymer is adjusted to an acid number of at least about 6 but not greater than 12. The treated hydroxyl terminated liquid polymer can be used to prepare polyurethanes having improved low temperature properties flexibility and hydrolytic stability.

9 Claims, No Drawings

PROCESS FOR TREATING HYDROXYL TERMINATED LIQUID POLYMERS

This is a continuation-in-part of our copending application Ser. No. 154,671, filed May 30, 1980, now abandoned.

BACKGROUND OF THE INVENTION

Hydroxyl terminated liquid polymers are useful as polyols in the formation of polyurethanes. In such reactions a hydroxyl terminated liquid polymer is reacted with an organic diisocyanate to form high molecular weight polyurethanes. In many instances it has been found that the hydroxyl terminated liquid polymers have been excessively active in reactions with the organic diisocyanate, resulting in premature gellation and excessive exotherms because of the rapid reactions which are often uncontrolled and may result in insoluble masses in short periods of time.

SUMMARY OF THE INVENTION

Hydroxyl terminated liquid polymers that are excessively active in reaction with organic diisocyanates may be deactivated by treating the hydroxyl terminated liquid polymer with phosphoric acid or sulfuric acid prior to reaction with the organic diisocyanate so that the hydroxyl terminated liquid polymer is adjusted to an acid number greater than 5 but not greater than 12. The treated hydroxyl terminated liquid polymer can be used to prepare isocyanate prepolymers which are stable liquids which can be converted to an elastomer with a chain extender, or elastomers can be prepared directly to provided tough polyurethanes having improved low temperature properties, flexibility and hydrolytic stability.

DETAILED DESCRIPTION

Carboxyl terminated liquid polymers including poly(-butadiene), butadiene-acrylonitrile co-polymers and alkyl acrylate polymers are known in the art. These carboxyl terminated liquid polymers are readily converted to hydroxyl terminated liquid polymers with a high degree of functionality of about 1.5 to, i.e. practically 2, indicative of the fact that a hydroxyl group is located at each end of the polymer chain. This conversion may be accomplished for example, by reaction of liquid carboxyl terminated polymer with 3 to 10 parts per hundred of polymer of ethylene oxide in the presence of 0.1 to 0.3 parts of an amine catalyst in accordance with the teachings of U.S. Pat. No. 3,551,471. Catalysts that may be employed for the conversion of carboxyl terminated polymer to hydroxyl terminated polymer include primary, secondary and tertiary mono- and polyamines. Particularly preferred are tertiary trialkyl amines such as trimethyl amine, triethyl amine, tributyl amine, triisoamyl amine and the like wherein the alkyl groups contain 1 to 8 carbon atoms. Catalyst is employed in the range of 0.1 to 0.5, i.e. 0.3, parts per hundred parts of liquid carboxyl terminated polymer. The reaction medium may be any solvent that will dissolve the carboxyl terminated polymers, and the hydroxyl terminated polymer which is formed. Acetone, tertiary butanol, methyl ethyl ketone, cyclohexanone, cyclohexanol, tetrahydrofuran and dioxane are typical solvents that may be used. Optionally the addition reaction may be run in a mass or bulk system with no solvent medium being employed. In such cases the ethylene oxide is preferably employed in excess. After the reaction, the polymers will contain greater than 0.1 to less than about 0.5 parts residual amine catalyst, more normally greater than 0.05, as about 0.1 to 0.2 parts. These polymers normally have molecular weights in the range of about 500 cps to 500,000 cps at 27° C. determined by Brookfield Viscometer, type RVT.

Carboxyl terminated polymers of butadiene, butadiene-acrylontrile and alkyl acrylates can be produced, for example, by the process taught in U.S. Pat. No. 3,285,949. Preferably the desired monomers are placed in a solvent with a low chain transfer potential, preferably tertiary butanol, and a bis-azocyano acid initiator, preferably azodicyanovaleric acid is added. Polymerizations are run at 70°–90° C. Product polymer is thrown down with a solvent such as methanol and separated by decantation. When the liquid carboxyl terminated polymers are reacted with ethylene oxide, the oxirane ring of ethylene oxide is opened up by reaction with chain terminal groups and converted from carboxyl to hydroxyl.

The hydroxyl terminated butadiene polymers and copolymers used in accordance with this invention include polybutadiene (HTB) and copolymers of butadiene containing more than 50 weight percent butadiene with the remainder at least one copolymerixable unsaturated olefinic vinylidene monomer. A particularly preferred comonomer is acrylonitrile (HTBN).

The hydroxyl terminated liquid acrylate (HTA) polymers contain polymerized therein at least about 65 wt. percent, more preferably at least about 85 wt. percent, of at least one alkyl acrylate wherein the alkyl groups contains from 1 to 10 carbon atoms, more preferably from 2 to 8 carbon atoms. The alkyl acrylate forms the backbone of the hydroxyl containing liquid polymer. Examples of suitable alkyl acrylates as the primary components of the polymer backbone include n-butyl acrylate, n-hexyl acrylate, 2-ethylhexyl acrylate and the like, and mixtures thereof. The hydroxyl containing alkyl acrylate liquid also may contain copolymerized therein at least one other olefinically unsaturated monomer, more preferably at least one other vinylidene monomer (i.e., a monomer containing at least one terminal $CH_2=C<$ group per molecule) in the polymeric backbone.

Preferred vinylidene comonomers in the polymeric backbone include (a) dienes containing 4 to 10 carbon atoms such as butadiene -1,3 (b) vinyl nitriles such as acrylonitrile and methacrylonitrile (c) other acrylates having the formula

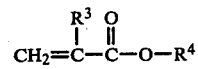

wherein $R^3$ is hydrogen or an alkyl radical containing 1 to 3 carbon atoms, and $R^4$ is hydrogen or an alkyl radical containing to 18 carbon atoms, preferably 1 to 8, or an alkoxyalkyl, alkylthioalkyl, or cyanoalkyl radical containing terminal groups and converted from carboxyl to hydroxyl.

The hydroxyl terminated butadiene polymers and copolymers used in accordance with this invention include polybutadiene (HTB) and copolymers of butadiene containing more than 50 weight percent butadiene with the remainder at least one copolymerizable unsaturated olefinic monomer. A particularly preferred comonomer is acrylonitrile (HTBN).

The hydroxyl terminated liquid acrylate (HTA) polymers contain polymerized therein at least about 65 wt. percent, more preferably at least about 85 wt. percent, of at least one alkyl acrylate wherein the alkyl group contains from 1 to 10 carbon atoms, more preferably from 2 to 8 carbon atoms. The alkyl acrylate forms the backbone of the hydroxyl containing liquid polymer. Examples of suitable alkyl acrylates as the primary components of the polymer backbone include n-butyl acrylate, n-hexyl acrylate, 2-ethylhexyl acrylate and the like, and mixtures thereof. The hydroxyl containing alkyl acrylate liquid also may contain copolymerized therein at least one other vinylidene monomer (i.e., a monomer containing at least one terminal $CH_2=C<$- group per molecule) in the polymeric backbone.

Preferred other vinylidene comonomers in the polymeric backbone include (a) vinyl nitriles such as acrylonitrile and methacrylonitrile, (b) other acrylates having the formula

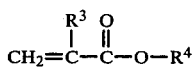

wherein $R^3$ is hydrogen or an alkyl radical containing 1 to 3 carbon atoms, and $R^4$ is hydrogen or an alkyl radical containing to 18 carbon atoms, or an alkoxyalkyl, alkylthioalkyl, or cyanoalkyl radical containing 2 to 12 carbon atoms, more preferably 2 to 8 carbon atoms. Alternatively, $R^3$ may be an alkyl radical containing 1 to 3 carbon atoms and $R^4$ an alkyl radical containing 3 to 10 carbon atoms; and N-vinyl-2-pyrrolidone, (c) vinyl aromatics such as styrene, methyl styrene, and the like; (d) vinyl and allyl esters of carboxylic acids containing 2 to 8 carbon atoms such as vinyl acetate, (e) vinyl and allyl ethers and ketones of alkyl radicals containing 1 to 8 carbon atoms such as vinyl methyl ether, allyl methyl ether, vinyl methyl ketone, and the like; and (f) monoolefins containing 2 to 14 carbon atoms, more preferably 2 to 8 carbon atoms, such as ethylene, propylene.

The polyurethanes are readily prepared from the hydroxyl terminated polymers having molecular weights greater than about 300 to 400. In the preparation of one type of elastomeric material, hydroxyl terminated polymers, alone or in admixture, having molecular weights greater than about 400, and difunctional chain extenders as diols, are reacted with an organic diisocyanate. Useful materials are obtained by reacting the organic diisocyanate with a mixture of hydroxyl terminated polymers and a small difunctional chain extender such as an alkylene glycol or ether glycol, a cycloaliphatic glycol, or an aromaticaliphatic glycol; or the so-called prepolymer technique may be used where an excess of organic diisocyanate is first reacted with the hydroxyl terminated polymers and then the small difunctional chain extender added, if desired, normally in amounts equivalent to react with substantially all of the free isocyanate groups.

If small glycols are used as chain extenders with the hydroxyl terminated polymers and the organic diisocyanate, these normally are aliphatic glycols or either glycols containing 2 to 10 carbon atoms. Typical glycols which have been employed include ethylene glycol, propylene glycol, butanediol-1,4, hexanediol, 2-ethylhexanediol-1,6, neopentyl glycol and the like. Cycloaliphatic glycols such as cyclohexanedimethanol, and aromaticaliphatic blycols such as bis-1,4 (β-hydroxyethoxy) benzene, may also be employed.

The amount of glycol chain extender used with the macroglycol and the diisocyanate may vary from about 0.1 to 12 mols per mol of macroglycol. Excellent polyurethanes are obtained with a molar ratio of one mol of macroglycol and 1 to 5 mols of the small chain extender glycol. Substituted glycols also may be used. If amines are used, they generally will be hindered aromatic amines such as methylene-bis-2-chloroaniline and the like.

The organic diisocyanates which are reacted with the macroglycols will include, for example, alicyclic, aliphatic and aromatic diisocyanates. Such aliphatic diisocyanates include for example, hexamethylene diisocyanate, methylene-bis (4-cyclohexyl isocyanate), isophorone diisocyanate, etc. The aromatic diisocyanates include naphthalene-1,5-diisocyanate, diphenyl methane-4, 4'-diisocyanate, (MDI) tolylene diisocyanate (TPI) p-phenylene diisocyanate, dichlorodiphenyl methane diisocyanate, dimethyl diphenyl methane diisocyanate, dibenzyl diisocyanate, diphenyl ether diisocyanates, bitolylene diisocyanates and the like, diisocyanates of the formula

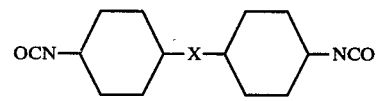

wherein X may be a valence bond, an alkylene radical containing 1 to 5 carbon atoms, oxygen, sulfur, sulfoxide, sulfone and the like. Also useful are acyclic or alicyclic diisocyanates containing greater than 6 carbon atoms as 4,4'-methylene-bis-(cyclohexyl isocyanate).

About equimolar ratios of diisocyanate and/or amines or diols may be used in the one shot reactions. When a small glycol chain extender is also used, the ratio of reactants employed may be varied from about 1.5 to 13 mols or organic diisocyanate per mol of macroglycol with 0.5 to 12 mols of the glycol. The amount of organic diisocyanate used is dependent on the total amount of chain extender and macroglycol and normally is a molar amount essentially equivalent to the total of these latter two reactants so that there are essentially no free unreacted isocyanate groups remaining in the polymer. Excellent polyurethanes have been obtained when a molar ratio of one mol of macroglycol of molecular weight about 800 to 2500, 1 to 3 glycol, and 2 to 4 mols of the aromatic diisocyanate are caused to react. Preferably less than 25%, as 6%, of excess organic diisocyanate can be used in forming prepolymers which are then reacted with chain extenders. These, of course, have to be kept free of moisture until further reaction with chain extender component is desired.

The acids used to increase the acid number of the hydroxyl terminated liquid polymers include phosphoric acid and sulfuric acid. Phosphoric acid normally is used as a 20 to 85 percent solution and sulfuric acid is normally used as a 20 to 96 percent solution. A convenient method to use in adding the acids to the hydroxyl terminated liquid polymers is a 1:1 by volume mixture with an inert solvent such as acetone and an amount of the mixture is added until the desired acid number is reached. The acid number (ASTM D2849-69) is the milligrams of potassium hydroxide used to neutralize one a gram of a sample (pH 7) and is determined by titration with 0.1 N potassium hydroxide solution. Of course, the strength of acid and amount of solvent may be varied, but since these solvents should be removed before reaction of the treated hydroxyl terminated liquid polymer, the amount of water and solvent should be kept to a minimum. Preferably a maximum of one weight percent of about 96% $H_2SO_4$ or about 85% $H_3PO_4$, based on the polymer weight is used to obtain the desired acid number increase of at least 3 points.

The acid number obtained, when it is measured on the hydroxyl terminated polymer, is the carboxyl acid number derived from any unreacted carboxyl groups. The acid number is determined with a strong base KOH, and this measures the weak residual carboxyl COOH acid groups in the polymer before treatment as well as strong acids. In order to obtain the advantages of this invention, it is necessary that this acid number be raised by the addition of the stronger sulfuric or phosphoric acid to a minimum total acid number of 6 with a minimum increase in total acid number of at least 3 to 4 points. The polymer carboxyl acid groups that are measured by the acid number test are of no effect in deactivating the polymer. There must be added as a minimum, enough sulfuric or phosphoric acid to both increase the total acid number by at least 3 points and to a minimum acid number of about 6 to a maximum of 12, i.e., 10. As an example, if a polymer to be treated has a carboxyl acid number of 1, it normally will be adjusted with sulfuric or phosphoric acid to a total acid number of 6. However, if the carboxyl acid number is 4, this polymer will have to be treated with enough sulfuric or phosphoric acid to raise the total acid number to 7 or 8 to deactivate it. To illustrate, a hydroxyl terminated polymer prepared with amine catalyst and having a carboxyl acid number of 4.5 was adjusted to a total acid number of 6.5 with sulfuric acid. This was not satisfactory and when the polymer was mixed with a diisocyanate it immediately gelled up. The polymer has to be adjusted to a total acid number of about 7.5 to 8 to be deactivated and not cause a gelling problem.

The acid used in treating the hydroxyl terminated liquid polymers are strong inorganic acids preferably phosphoric acid or sulfuric acid. Hydrogen chloride and nitric acid are not preferred because of volatility, but could be used under proper conditions. Such acids as oxalic, succinic, acetic, glycolic, chlorosulphonic and the like are completely unsatisfactory in treating the hydroxyl terminated liquid polymer to provide materials that reacted with organic diisocyanate in controlled reactions.

If the hydroxyl polymer is reacted with a stoichiometric excess of diisocyanate, a prepolymer terminated in isocyanate functional group is formed. The reaction is exothermic and caution must be exercised to dissipate the heat so that unwanted crosslinking reactions are prevented from occuring. The prepolymer becomes component A of a two component system. Component B, usually a low molecular weight glycol, is mixed with the prepolymer. Once mixed a cure in situ is effected by a mechanism of chain extension followed by crosslinking. The degree of crosslinking depends upon the stoichiometric excess of isocyanate function over the hydroxyl function allowed for in the compound formulation. This method has the advantage of dissipating the heat of exotherm in the prepolymer preparation step so that the cure of large articles can proceed with better temperature control. There is a processing disadvantage of having to use a higher viscosity prepolymer starting material because of the increased molecular weight. The one shot method involves the mixing of all ingredients at once and in situ cure occurs by a random network formation. This method has the advantage of lower viscosity starting materials for processing. This method is, however, ideal for in situ foam preparation where the heat of exotherm is utilized for activating the chemical blowing agent added to the system.

In the practice of the invention; an acid number analysis is first performed on the lot of HTB, HTBN, and HTA "as is". These hydroxyl containing liquid polymers were prepared in accordance with the procedure of U.S. Pat. No. 3,551,471. Phosphoric acid supplied as the 85% solution and diluted 1:1 by volume with acetone is added to Hycar HTBN for deactivation. An amount of phosphoric acid which will increase the acid number by 3-6 units is a useful guide sufficient to prevent gellation in preparing isocyanate prepolymer. The amount of phosphoric acid addition needed usually is less than 1% of the Hycar HTBN. The deactivated HTBN is evaluated using the previously described TDI prepolymer formulation. The exotherm is recorded over a 1 hour period. Isocyanate analyses are run periodically and compared with the theoretical value to determine the completed prepolymer reaction. Viscosity measurements are made on the final product. The prepolymer is stored protected from moisture for subsequent use in cured polyurethane elastomer evaluation.

The general procedure for prepolymer preparation used for the example is as follows: A prepolymer batch size of 500 weight parts is prepared in a glass resin kettle fitted with a stirrer, connection to a vacuum source, and a thermocouple connected to a termperature recording device. Hycar HTBN is weighed into a 1000 cc. resin kettle and heated to 100° C. with stirring while degassing with a vacuum of 1 mm Hg pressure. After 30 minutes at 100° C. trace amounts of water and other volatiles are essentially removed and the HTBN is allowed to cool to 80° C. and maintained at this temperature by a temperature controlled oil bath. TDI is added to the stirring HTBN and the exotherm is recorded. Rapid temperature rise and gellation occurs with non-deactivated Hycar HTBN under these conditions while phosphoric acid deactivated HTBN exhibits only mild exotherm and no gel.

Polyurethane elastomers for evaluation of physical properties were prepared according to the following example:

|  | Eq. wt. | Eq. Ratio | Weight % |
| --- | --- | --- | --- |
| HTBN/TDI Prepolymer, % NCO - 6.5 | 646 | 1.00 | 86.7 |
| Hydroquinone ethanol ether (HQEE) | 99 | 1.00 | 13.3 |

The prepolymer was heated to 105° C. with stirring while degassing at 5 mm Hg pressure. HQEE was added and mixed under vacuum for 15 minutes. The fluid was poured into preheated 120° C. Teflon lined molds and cured 16 hours at 120° C. After 7 days aging physical tests were run on the materials for comparative evaluation.

The following examples further demonstrate the practice of the invention.

EXAMPLE I

A hydroxyl terminated liquid copolymer of butadiene-1,3 and acrylonitrile (HTBN) containing 17 weight percent acrylonitrile was reacted with two different diisocyanates, tolylene diisocyanate (TDI) and methylene diphenyl diisocyanate (MDI) in an excess amount to prepare a prepolymer as described above, and then reacted with hydroquinone ethanol ether (HQEE) as a chain extender to form a polyurethane elastomer. The HTBN had a viscosity of 100,000 cps at 27° C., hydroxyl number (ASTM D2849-69) of 33 and an acid number of 3. The HTBN was treated with a 1:1 ratio of 85% phosphoric acid and acetone to an acid number of 6. The reactant ratios and resulting physical property of the polyurethane are set forth in Data Table I.

DATA TABLE I

|  | 1 | | 2 | |
|---|---|---|---|---|
|  | Eq. Ratio | Wt. % | Eq. Ratio | Wt. % |
| HTBN | 1.00 | 71.4 | 1.00 | 76.1 |
| TDI 80/20* | 4.24 | 15.3 | — | — |
| MDI | — | — | 3.00 | 16.5 |
| HQEE | 3.24 | 13.3 | 1.70 | 7.4 |
| OH/NCO | 1.0 | | 0.9 | |
| Physical Properties | | | | |
| Hardness, Shore A | 72 | | 72 | |
| Tensile Strength, PSI | 1635 | | 1480 | |
| Elongation, % | 970 | | 530 | |
| Tear, Die C, Lbs/In | 230 | | 233 | |
| Gehman Freeze Pt., ° C. | −54 | | −53 | |

*80% 2,4 - TDI and 20% 2,6 - TDI

The resulting elastomers all feature good tear strength for their hardness and also feature good low temperature flexibility and high elongation. When an attempt was made to repeat these two examples with HTBN that had not been treated with phosphoric acid, and had an acid number of 0.6, the resulting reaction went out of control and formed a gelled mass having no utility.

EXAMPLE II

In this example a hydroxyl terminated liquid polybutadiene was employed (HTB) having a viscosity of 49,700 cps at 27° C. and a hydroxyl number of 25.2. The ratio of reactants, acid number of the HTB before and after treatment with the phosphoric acid, and the viscosity after reaction of the HTB with excess tolylene diisocyanate are set forth in Data Table II.

DATA TABLE II

|  | Eq. Wt. | Eq. Ratio | Weight % |
|---|---|---|---|
| HTB 2000 × 166 | 2,012 | 1.00 | 82.96 |
| TDI 80/20 | 87 | 4.75 | 17.04 |
| Analyses | | | |
| % Isocyanate | 6.76 (0.5 hours @ 80° C.) | | |
|  | 6.64 (1.0 hours @ 80° C.) | | |
|  | 6.66 (1.5 hours @ 80° C.) | | |
|  | 6.50 (Theoretical) | | |
| Viscosity @ 27° C. | 41,000 cps | | |
| @ 80° C. | 4,040 cps | | |
| Acid No. before $H_3PO_4$ | 1.8 | | |
| after $H_3PO_4$ | 6.3 | | |

The resulting prepolymer was then reacted with hydroquinone ethanol ether in the amount set forth in Data Table III. The physical properties of the polyurethane elastomers are also set forth in this table. An excellent cure was obtained and the elastomer had good tear resistence, high elongation and especially good Gehman freeze point properties.

DATA TABLE III

|  | Eq. Ratio | Weight % |
|---|---|---|
| HTB/TDI Prepolymer | 1.00 | 87.60 |
| Hydroquinone Ethanol Ether HQEE | 0.90 | 12.40 |
| OH/NCO = 0.9 | | |
| Physical Properties | | |
| Hardness Shore | | 68 |
| Tensile Strength, PSI | | 1,400 |
| Elongation, % | | 475 |
| Tear, Die C, lbs/in | | 245 |
| Gehman Freeze Point, ° C. | | −79 |
| Pot life @ 100° C., hours | | 1 |

Polyurethane made with HTB adjusted to an acid number of 10 also provided satisfactory polyurethane. Excellent results are also obtained when 96% sulfuric acid is employed to adjust the acid number.

These polyurethanes find many uses as articles where the physical properties of the polymer offer advantages. These include mechanical goods and parts for use in automotive, building, furniture and appliance industries. Such items are readily formed by conventional methods.

We claim:

1. A process for improving the reactivity of hydroxyl terminated liquid polymers with organic polyisocyanates which comprises adding 20 to 96% sulfuric acid or 20 to 85% phosphoric acid to said hydroxyl terminated liquid polymers in amount to increase the total acid number of said polymer by at least three points to an acid number of about 6 to 12, said hydroxyl terminated liquid polymers being the reaction product of liquid carboxyl terminated polymers with 3 to 10 parts per 100 of polymer of ethylene oxide in the presence of 0.1 to 0.5 of an amine catalyst, said reaction product containing greater than 0.01 to less than about 0.5 part residual amine catalyst, said liquid carboxyl terminated polymers being selected from the group consisting of (1) carboxyl terminated poly(butadiene-1,3), (2) carboxyl terminated copolymers of butadiene-1,3 and acrylonitrile containing more than 50 weight percent butadiene with the remainder being acrylonitrile, and (3) carboxyl terminated poly(alkyl acrylate) polymers of alkyl acrylates wherein the alkyl groups contains 1 to 18 carbon atoms.

2. A process of claim 1 wherein said acid is sulfuric acid concentration of about 96%.

3. A process of claim 2 wherein said carboxyl terminated polymer is poly(butadiene-1,3).

4. A process of claim 2 wherein said carboxyl terminated polymer is a copolymer of more than 50% butadiene-1,3 and less than 50% acrylonitrile.

5. A process of claim 2 wherein said carboxyl terminated polymer is a polymer of an alkyl acrylate wherein the alkyl groups contains 2 to 8 carbon atoms.

6. A process of claim 1 wherein said acid is phosphoric acid of a concentration of about 85%.

7. A process of claim 6 wherein said carboxyl terminated polymer is poly(butadiene-1,3).

8. A process of claim 6 wherein said carboxyl terminated polymer is a copolymer of more than 50% butadiene-1,3 and less than 50% acrylonitrile.

9. A process of claim 6 wherein said carboxyl terminated polymer is a polymer of an alkyl acrylate wherein the alkyl groups contains 2 to 8 carbon atoms.

* * * * *